(12) United States Patent
Kim

(10) Patent No.: US 9,845,904 B2
(45) Date of Patent: Dec. 19, 2017

(54) LOOSENING-PREVENTING DEVICE FOR PIPE FITTING

(71) Applicant: Jeong-Nam Kim, Gwangju (KR)

(72) Inventor: Jeong-Nam Kim, Gwangju (KR)

(73) Assignee: SSOLLOCK CO., LTD, Gwangju (KR)

( * ) Notice: Subject to any disclaimer, the term of this patent is extended or adjusted under 35 U.S.C. 154(b) by 0 days.

(21) Appl. No.: 14/894,332

(22) PCT Filed: Sep. 12, 2014

(86) PCT No.: PCT/KR2014/008530
§ 371 (c)(1),
(2) Date: Nov. 25, 2015

(87) PCT Pub. No.: WO2015/053487
PCT Pub. Date: Apr. 16, 2015

(65) Prior Publication Data
US 2016/0208963 A1    Jul. 21, 2016

(30) Foreign Application Priority Data
Oct. 10, 2013   (KR) .................. 10-2013-0120252

(51) Int. Cl.
*F16L 15/08*       (2006.01)
*F16B 39/02*       (2006.01)

(52) U.S. Cl.
CPC ............. *F16L 15/08* (2013.01); *F16B 39/02* (2013.01); *F16L 2201/20* (2013.01)

(58) Field of Classification Search
CPC ........ F16B 39/02; F16B 41/07; F16L 19/005; F16L 15/08

USPC ............................ 285/92, 86, 114, 384, 353
See application file for complete search history.

(56) References Cited

U.S. PATENT DOCUMENTS

| | | | | |
|---|---|---|---|---|
| 919,913 A | * | 4/1909 | Miller ................. | A61M 39/105 285/384 |
| 2,457,384 A | * | 12/1948 | Krenz ................... | F16L 27/047 285/384 |
| 3,223,438 A | * | 12/1965 | De Cenzo ........... | F16L 19/0218 285/353 |
| 3,563,576 A | * | 2/1971 | Lee ..................... | F16L 19/0231 285/353 |
| 3,679,237 A | * | 7/1972 | De Angelis .......... | F16L 19/025 285/353 |

(Continued)

FOREIGN PATENT DOCUMENTS

| | | |
|---|---|---|
| JP | 61-055581 U | 4/1986 |
| KR | 10-1271984 B1 | 2/2013 |
| WO | 91-12458 A1 | 8/1991 |

*Primary Examiner* — David E Bochna
(74) *Attorney, Agent, or Firm* — John K. Park; Park Law Firm

(57) ABSTRACT

A loosening-preventing device for pipe fitting. In the device, a casing includes a semispherical member equipped with an open surface, a female screw thread disposed at one end of the semispherical member, and a finishing member disposed at the other end of the semispherical member. A locking member has a male screw thread and a head at one end of the male screw thread, so as to connect to the female screw thread of the casing. The screw clamping of the casing and the locking member prevents the pipe fitting from rotating, thereby preventing the pipe fitting from being loosened.

10 Claims, 5 Drawing Sheets

(56) References Cited

U.S. PATENT DOCUMENTS

| | | | | | |
|---|---|---|---|---|---|
| 4,273,366 | A | * | 6/1981 | Ekstrom | A61B 5/03 285/384 |
| 4,580,788 | A | * | 4/1986 | Rabe | F16J 15/188 285/353 |
| 5,161,835 | A | * | 11/1992 | Miyake | F16L 19/0212 285/353 |
| 5,312,139 | A | | 5/1994 | Marks | |
| 5,490,693 | A | * | 2/1996 | Fisher | F16L 19/005 285/92 |
| 5,524,936 | A | * | 6/1996 | Barr | F16L 19/005 285/92 |
| 5,882,044 | A | * | 3/1999 | Sloane | F16L 19/005 285/92 |
| 6,981,721 | B2 | * | 1/2006 | Karasawa | F16L 15/08 285/353 |
| 7,681,926 | B2 | * | 3/2010 | Valaskovic | B01L 3/565 285/353 |
| 2015/0362108 | A1 | * | 12/2015 | Lefebvre | F16L 15/08 285/89 |
| 2016/0377205 | A1 | * | 12/2016 | Johnston | F16L 15/08 285/80 |

\* cited by examiner

[Fig.1]
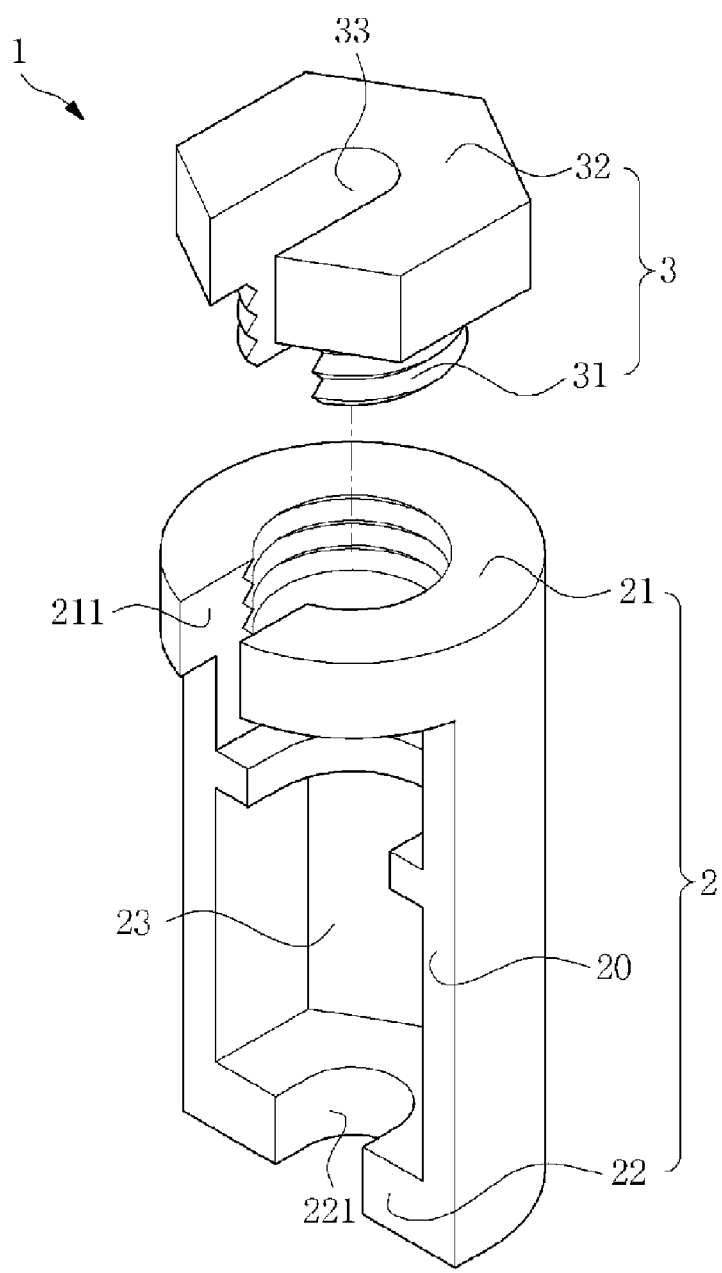

[Fig.2]
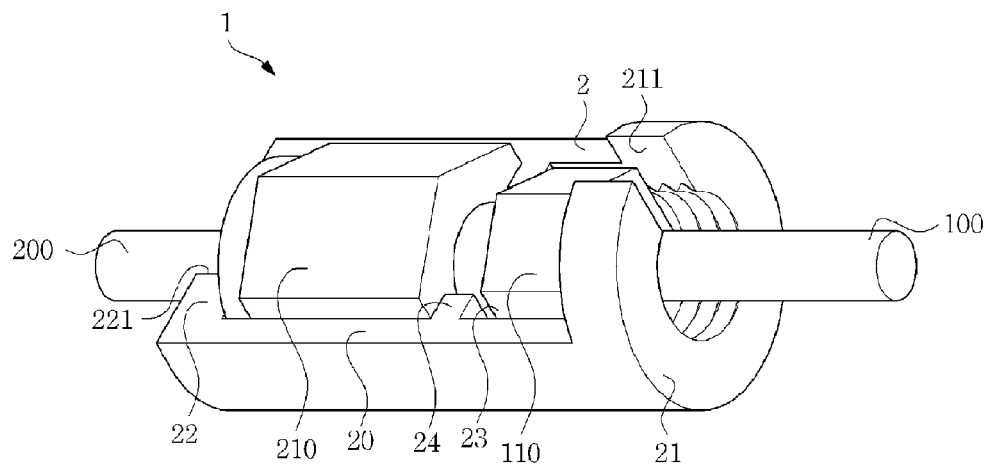
[Fig.3a]
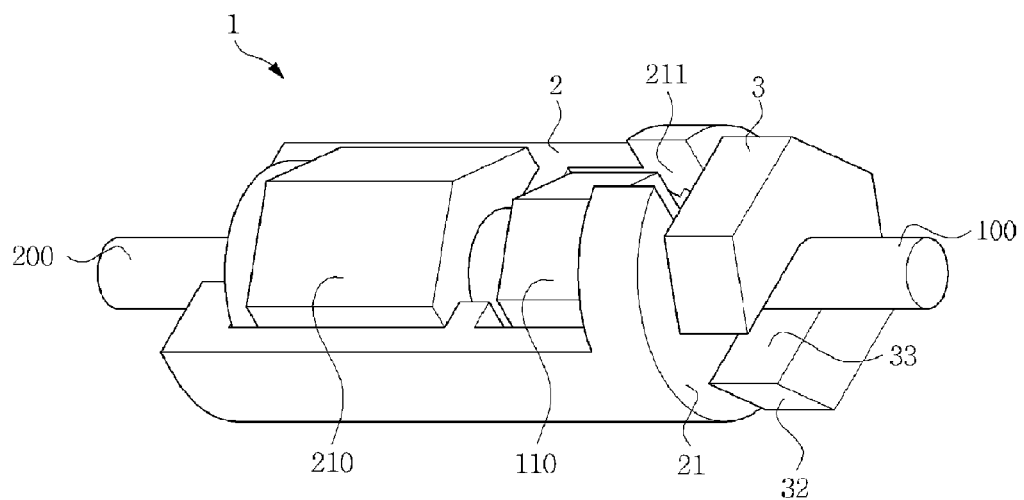

[Fig.3b]
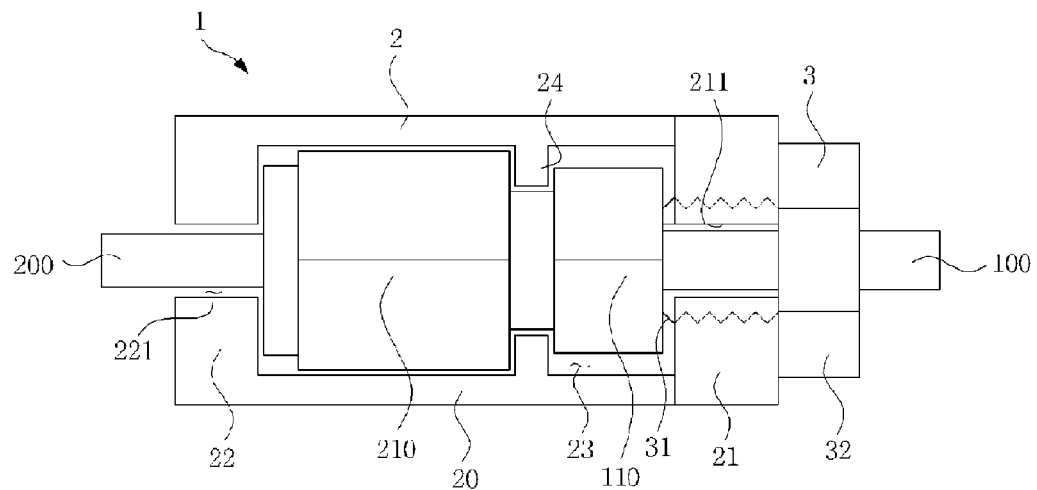
[Fig.4a]
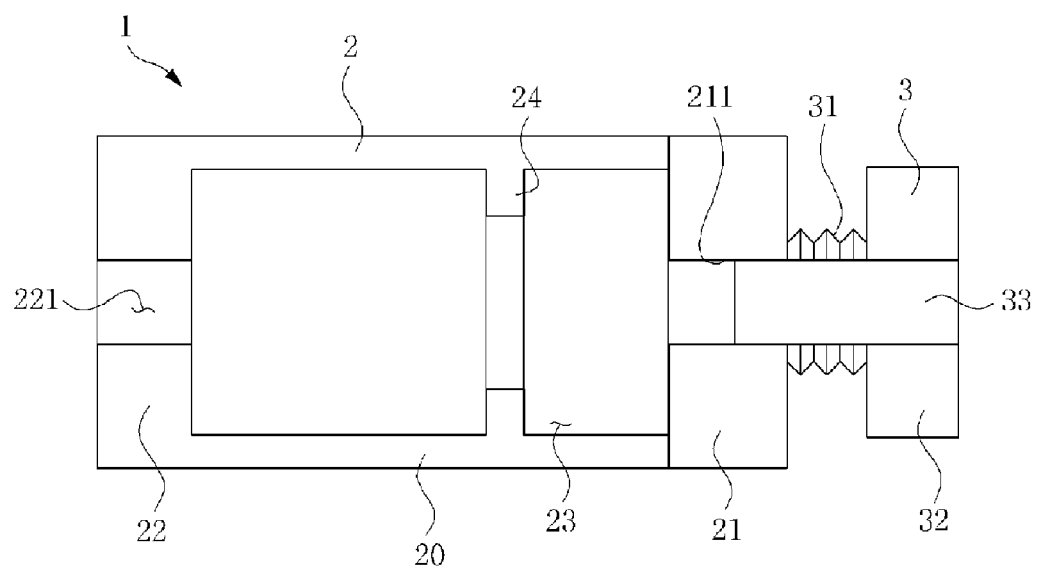

[Fig.4b]
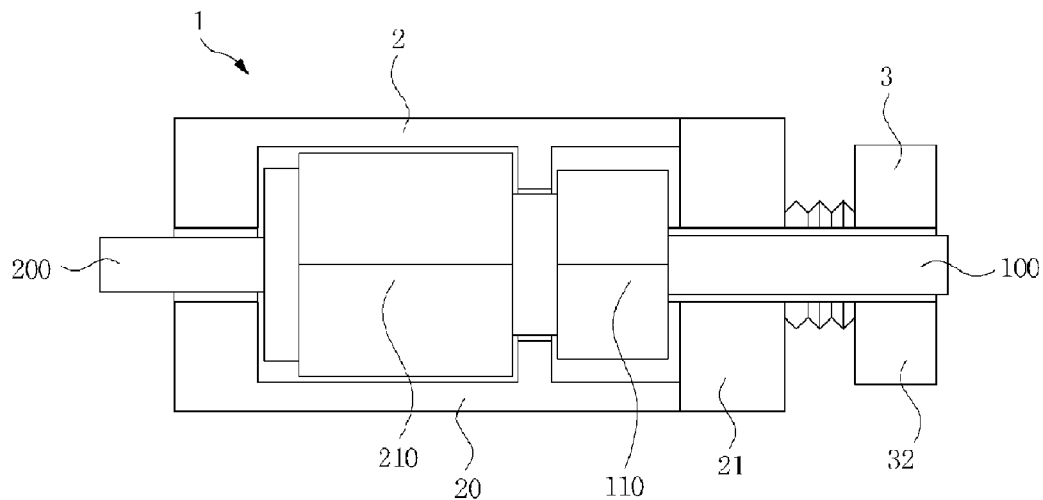
[Fig.4c]
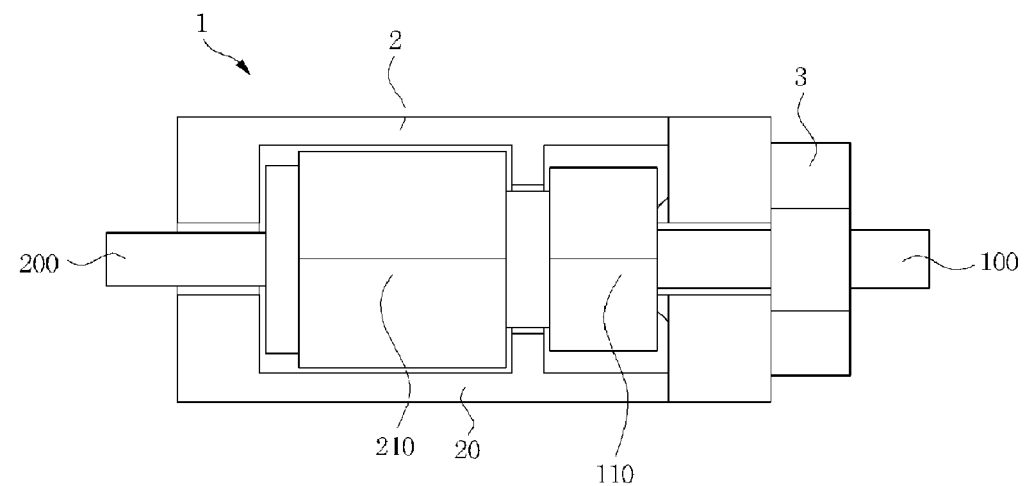

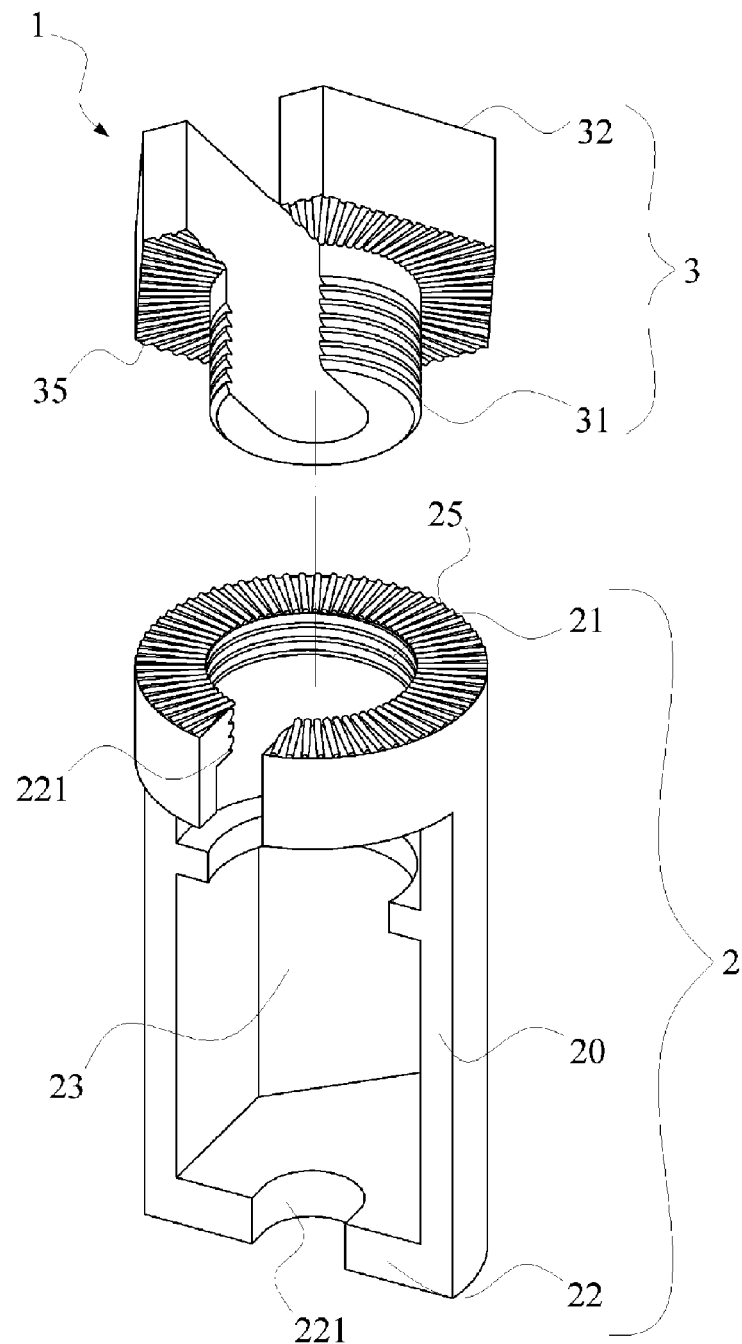
[Fig.5]

US 9,845,904 B2

LOOSENING-PREVENTING DEVICE FOR PIPE FITTING

TECHNICAL FIELD

The present invention relates to a loosening prevention device for a pipe fitting.

BACKGROUND ART

As pipes are applied to a variety of industrial fields, pipes must to be extended as required. That is, one pipe and another pipe are connected to each other by means of a connector referred to as a fitting, thereby producing a pipe structure having a predetermined length. The fitting used for connecting the pipes is exposed for a prolonged period to vibrations caused by fluid flowing along the pipes, such that the fastening force of the fitting is inevitably reduced.

In this regard, Patent Document 1 of the related art disclosed a pipe fitting-fixing member able to maintain the fastening of the fitting. The pipe fitting-fixing member includes a fixing part having one or more slots and mounting parts on both ends of the fixing part.

Two mounting parts are mounted on a pipe at one side and a pipe at the other side that are to be connected to a penetrating part by means of a fitting. Catch protrusions formed on the bottom of the penetrating part are designed to hold and support the pipes. In addition, according to Patent Document 1, the corners of the fitting member are positioned in the slots of the fixing part in order to prevent the polygonal fitting member from being unfastened through rotation thereof.

It is described in Patent Document 1 of the related art that the pipes extending across the penetrating part are supported by the catch protrusions formed on mounting recesses holding the pipes. However, when the catch protrusions are formed of a hard material, the pipes cannot be fitted into the mounting recesses across the catch protrusions. Alternatively, when the catch protrusions are formed of a soft material, the pipes can be reliably introduced into the mounting recesses. However, it is highly probable that the pipes may be dislodged from the mounting recesses.

In addition, due to the structural characteristics of one or more slots, when the slots are bent (by being warped or deformed) by external force, the slots may not reliably hold the corners of the fitting member positioned between the slots, thereby failing to prevent the fitting member from rotating due to vibration and impacts in the pipes in which fluid flows.

According to the pipe fitting-fixing member disclosed in Patent Document 1 as described above, it is impossible to reliably prevent the fitting member from rotating due to the catch protrusions supporting the pipes, the warping of the slots, and the like. Thus, an approach able to reliably fix the fitting member is required.

RELATED ART DOCUMENT (Patent Document 1) Korean Patent No. 10-1271984

DISCLOSURE

Technical Problem

Accordingly, the present invention has been made keeping in mind the above problems occurring in the related art, and the present invention is intended to prevent a fitting between pipes from being unfastened, the pipes connected to increase the length of the resultant pipe structure.

Technical Solution

In order to achieve the above object, according to one aspect of the present invention, a loosening prevention device for a pipe fitting includes: a casing including a semi-barrel member having an opening, a female thread part disposed on one end of the semi-barrel member, and a closing member disposed on the other end of the semi-barrel member; and a locking member including a male thread part configured to be engaged with the female thread part of the casing and a head disposed on one end of the male thread part. The pipe fitting can be fixed through the screw engagement between the casing and the locking member.

According to the present invention, the female thread part may have a first insert opening extending from the outer circumference to the central portion of the female thread part. A pipe at one side can be seated in the casing through the first insert opening.

In this regard, the size of the first insert opening may be equal to or greater than the diameter of the pipe at one side that extends across the female thread part.

According to the present invention, the closing member may have a second insert opening extending from the outer circumference to the central portion of the closing member. A pipe at the other side can be seated in the casing through the second insert opening.

In this regard, the size of the second insert opening may be equal to or greater than the diameter of a pipe at the other side that extends across the closing member.

It is preferable that the first insert opening, the second insert opening, and the opening of the semi-barrel member are arranged in a single direction. In the casing according to the present invention, as described above, the pipe fitting is accommodated in the inner space of the casing defined by the semi-barrel member, the female thread part, and the U-shaped closing member. Since one side of the casing is open, the pipe fitting can be fitted into and detached from the inner space without being disassembled.

The inner surface of the semi-barrel member may be shaped identical to the outer shape of the pipe fitting. The inner surface of the semi-barrel member is shaped identical to the outer shape of the pipe fitting such that the pipe fitting can be fixed to the semi-barrel member. It is thereby possible to prevent the pipe fitting from unnecessarily rotating in the inner space of the semi-barrel member.

In addition, the semi-barrel member may further include a rib extending on the inner circumference thereof. The rib may be disposed between the pipe at one side and the pipe at the other side to be connected to each other.

The locking member may have a third insert opening extending in a longitudinal direction thereof. The pipe at the other side can be seated in the casing through the third insert opening.

In this regard, the size of the third insert opening may be equal to or greater than the diameter of the pipe at one side that extends through the locking member.

Selectively, the outer circumference of the female thread part may have a polygonal shape.

According to another embodiment of the present invention, the female thread part of the casing may have protrusions on the top surface thereof, the protrusions being arranged radially.

The head of the locking member may have protrusions on the bottom surface thereof, the protrusions being arranged radially.

The features and advantages of the present invention will be more clearly understood from the following detailed description when taken in conjunction with the accompanying drawings.

The terminologies or words used in the description and the claims of the present invention should not be interpreted as being limited to common and dictionary meanings. On the contrary, they should be interpreted as the meanings and concepts of the present invention in compliance with the scope of the present invention on the basis of the principle that the inventor(s) can appropriately define the terms in order to describe the present invention in the best way.

Advantageous Effects

According to the present invention as set forth above, it is possible to prevent the fitting from be unfastened by continuously pressing the fitting, whereby fluid flowing along pipes to be connected in length is reliably prevented from leaking.

In addition, according to the present invention, it is possible to prevent the fitting from being loosened by seating the fitting within the casing and clamping the locking member to the casing in a screw engagement manner. It is thereby possible to reduce the number of operational steps of a worker and provide the ease of assembly.

Since the present invention is fixed in a screw engagement manner, it is possible to easily replace and/or repair the fitting disposed between pipes to be connected in length.

Since the present invention includes the casing and the locking member that are screw-engaged, the present invention can be reused instead of being disposable.

Furthermore, according to the present invention, it is possible to visually examine the interior of the loosening prevention device. It is therefore possible to examine the state of the pipe fitting to be seated in the loosening prevention device in real time, thereby rapidly taking necessary actions.

DESCRIPTION OF DRAWINGS

FIG. 1 is an exploded perspective view illustrating a loosening prevention device for a pipe fitting according to an exemplary embodiment of the present invention;

FIG. 2 is a view illustrating the pipe fitting disposed within an inner space of a casing of the loosening prevention device for a pipe fitting according to the present invention;

FIG. 3a and FIG. 3b are views illustrating the pipe fitting, the position of which is fixed within the loosening prevention device according to the embodiment of the present invention;

FIG. 4a to FIG. 4c are views illustrating the steps of the assembly operation of the loosening prevention device according to the present invention and a pipe fitting; and FIG. 5 is a view schematically illustrating a loosening prevention device for a pipe fitting according to another embodiment of the present invention.

BEST MODE

Reference will now be made in greater detail to loosening prevention device for a pipe fitting according to the present invention with reference to the accompanying drawings.

The advantages and features of the present invention as well as methods of realizing the advantages and features will be more apparent from embodiments to be described below in conjunction with the accompanying drawings. Throughout this document, reference should be made to the drawings, in which the same reference numerals and symbols will be used throughout the different drawings to designate the same or like components. In the following description, detailed descriptions of known functions and components incorporated herein will be omitted in the case that the subject matter of the present disclosure may be rendered unclear thereby.

FIG. 1 is an exploded perspective view illustrating a loosening prevention device for a pipe fitting according to an exemplary embodiment of the present invention.

Referring to FIG. 1, the loosening prevention device 1 for a pipe fitting according to the present invention includes a casing 2 and a locking member 3. In particular, the casing 2 and the locking member 3 can be bound to each other by screw engagement.

The casing 2 includes a semi-barrel member 20 having an opening, a female thread part 21 covering one end of the semi-barrel member 20, and a U-shaped closing member 22 covering the other end of the semi-barrel member 20.

As illustrated, in the semi-barrel member 20, the female thread part 21 is disposed on one end (the top portion in FIG. 1), and the closing member 22 is disposed on the other end (the bottom portion in FIG. 2). Specifically, the semi-barrel member has a semi-cylindrical shape including one end, the other end, and the opening extending in the longitudinal direction. Although the semi-barrel member 20 illustrated in FIG. 1 has the semi-cylindrical shape, this is not intended to be limiting. It must be understood that the semi-barrel member 20 may be implemented as any of a variety of three-dimensional (3D) structures, such as a box-shaped structure.

As described above, the female thread part 21 is disposed on one end of the semi-barrel member 20, and allows the semi-barrel member 20 to be screw-engaged with the locking member 3 to be described later. The female thread part 21 has female threads on the inner circumference thereof and it is preferable that the female thread part 21 has a first insert opening 211. The first insert opening 211 extends from the outer circumference to the central portion of the female thread part 21. The first insert opening 211 serves as a path along which a pipe can be guided into the female thread part 21. The size of the first insert opening 211 is equal to or greater than the outer diameter of a pipe at one side, thereby allowing the one-side pipe to be smoothly inserted therethrough.

The closing member 22 is disposed on the other end of the semi-barrel member 20 to face the female thread part 21. The closing member 22 serves to help a pipe at the other side to be properly seated in position. The closing member 22 is a U-shaped component member having a second insert opening 221. As described above, the second insert opening 221 of the closing member 22 provides a path along which the pipe at the other side can be guided into the closing member 22 such that the pipe at the other side can held therein. The size of the second insert opening 221 is equal to or greater than the outer diameter of the pipe at the other side, thereby allowing the pipe at the other side to be smoothly inserted therethrough.

The casing 2 according to the present invention forms an interior space 23 defined by the semi-barrel member 20, the female thread part 21, and the U-shaped closing member 22.

The interior space 23 accommodates therein the pipe at one side, the pipe at the other side, and a fitting member coupling the pipes.

The present invention includes the locking member 3 coupled to the casing 2. In general, the locking member 3 has the shape of a bolt. Specifically, the locking member 3 includes a male thread part 31 having a predetermined length and diameter and a head part 32 formed on one end of the male thread part 31. The male thread part 31 is screw-engaged with the female thread part 21. It is preferable that the locking member 3 has a third insert opening 33 extending in the longitudinal direction thereof. As illustrated in FIG. 1, the third insert opening 33 extends in the direction of the center from the outer circumference of the head part 32 and the outer circumference of the male thread part 31, such that the pipe at one side can be seated in the third insert opening 33 of the locking member 3. The size of the locking member 3 is equal to or greater than the outer diameter of the pipe at one side, thereby facilitating the insertion of the pipe at one side.

Particularly, the loosening prevention device 1 for a pipe fitting according to the present invention is designed such that the first insert opening 211, the second insert opening 221, and the opening of the semi-barrel member 20 are arranged in the same direction. Thus, the pipe at one side and the pipe at the other side coupled using the fitting can be more easily seated in the interior space 23 of the casing 2.

In addition, according to the present invention, the first insert opening 211, the second insert opening 221, and the third insert opening 33 are arranged coaxially such that the pipe at one side and the pipe at the other side that are fitted can be arranged in line. This can consequently prevent the fitting from becoming loosened while ensuring that the pipe at one side and the pipe at the other side are aligned.

FIG. 2 is a view illustrating the pipe fitting disposed within the inner space of the casing of the loosening prevention device for a pipe fitting according to the present invention;

Referring to FIG. 2, the loosening prevention device 1 for a pipe fitting according to the present invention has a pipe fitting (designated with no reference numeral) disposed in the interior space 23. The loosening prevention device 1 accommodates a pipe 100 at one side and a pipe 200 at the other side extending through both ends thereof, and connects the pipe 100 and the pipe 200 to each other, thereby increasing the length of the resultant pipe structure. Specifically, the interior space 23 of the casing 2 accommodates the pipe fitting therein through the opening of the semi-barrel member 20, the pipe 100 at one side is seated in the first insert opening 211 of the female thread part 21, and the pipe 200 at the other side is seated in the second insert opening 221 of the closing member 22.

For reference, the pipe fitting connects the proximal end of the pipe 100 at one side and the proximal end of the pipe 200 at the other side to each other in a closing manner by connecting a first nut (male nut) 110 disposed on the proximal end of the pipe 100 and a second number (female nut) 210 disposed on the proximal end of the pipe 200 to each other.

A gasket (or an O-ring) is disposed between the joining portions of the first nut 110 and the second nut 210 in order to prevent fluid flowing along the resultant pipe structure having the increased length from leaking.

It is preferable that the shape of the inner surface of the semi-barrel member 20 is the same as the outer shape of the pipe fitting, for example, the second nut 210, such that the pipe fitting minimizes unnecessary flows within the casing 2. The protruding corner of the second nut 210 is reliably seated in the inner surface of the semi-barrel member 20, such that the pipe fitting including the second nut 210 does not rotate.

In addition, the present invention includes rib 24 extending on the inner circumference of the semi-barrel member 20. As illustrated, the rib 24 is disposed between the first nut 110 and the second nut 210. The rib 24 not only limits the sliding of the loosening prevention device 1 according to the present invention disposed around the pipe fitting that moves in the longitudinal direction of the pipes, but also overlaps the rib 24 and the first nut 110 such that the first nut 110 disposed on the pipe 100 at one side can be arranged in position within the casing 2 when the locking member 3 is fastened.

FIG. 3a and FIG. 3b are views illustrating the pipe fitting, the position of which is fixed within the loosening prevention device according to the embodiment of the present invention. FIG. 3a is a perspective view of the loosening prevention device according to the present invention and the pipe fitting, and FIG. 3b is a front elevation view of the loosening prevention device according to the present invention and the pipe fitting.

Referring to FIG. 3a and FIG. 3b, it is possible to examine the assembly state of the pipe fitting to the loosening prevention device 1 that allows for the increase in the length of the resultant pipe structure and prevents the pipe fitting from being loosened as described above. More particularly, the third insert opening 33 of the screw-engaged locking member 33 is not aligned with the second insert opening 211 in order to prevent the loosening prevention device 1 and the pipe fitting from being separated from each other.

FIG. 4a to FIG. 4c are views illustrating the steps of the assembly operation of the loosening prevention device according to the present invention and a pipe fitting. The assembly operation illustrated in FIGS. 4a to 4c is merely an example of the operation of assembling the loosening prevention device according to the present invention and the pipe fitting, and this is not intended to be limiting. It should be understood that the loosening prevention device according to the present invention and the pipe fitting can be fastened with each other by a variety of methods.

First, according to the present invention, the loosening prevention device 1 is assembled by fastening the male thread part 31 of the locking member 3 into the female thread part 21 of the casing 2. The casing 2 and the locking member 3 are temporarily fastened before being fitted around the pipe fitting, such that the pipe fitting can be easily fitted into the interior space of the casing 2 (see FIG. 4a). In the loosening prevention device 1 according to the present invention, the opening of the first insert opening 211, the opening of the second insert opening 211, the opening of the semi-barrel member 20, and the third insert opening 33 of the locking member 3 may be previously arranged in the same direction in order to facilitate the introduction of the pipe fitting into the interior space 23 of the casing 2. With this configuration, the pipe 100 at one side and the pipe 200 at the other side coupled using the pipe fitting can be easily seated in the interior space 23 of the casing 2 (see FIG. 4b).

Afterwards, as illustrated in FIG. 4c, the locking member 3 is fastened in the direction of the proximal end of the pipe 100, i.e. toward the female thread part 21. The locking member 3 is screw-engaged with the female thread part 21 by clamping the locking member 3 using a clamping jig, for example, a spanner.

Along with the locking member 3 being clamped, the distal end of the male thread part 31 of the locking member 3 comes into contact with the first nut 110, thereby pressing the first nut 110. This can restrict unnecessary rotation of the first nut 110 and/or the second nut 210, thereby preventing the first nut 110 and the second nut 210 from being unfastened. In addition, the distal end of the male thread part 21 presses only the top surface of the first nut 110, such that the circumferential surface of the first nut is not damaged. It is thereby possible to easily unfasten and fasten the nut when replacing and/or repairing the pipe fitting. As described above, although the screw engagement prevents the pipe fitting from being dislodged from the interior space 23 of the loosening prevention device 1, the third insert opening 33 of the locking member 3 is misaligned with the opening of the semi-barrel member 20 such that the pipe fitting can be reliably accommodated in the interior space (see FIG. 3a).

The outer circumference of the female thread part 21 may have the shape of a polygon or a hexagon such that the casing-fixing jig can be reliably grasped. This can facilitate the fixing of the casing 2 when clamping the locking member 3 using the spanner while the locking member 3 is being selectively fastened. In the drawings, the outer circumference of the female thread part 21 is illustrated as having a circular cross-section.

In particular, even if the loosening prevention device according to the present invention is formed of an opaque material, a worker can visually recognize the state of the pipe fitting accommodated within the loosening prevention device 1 through the opening of the semi-barrel member 20. Thus, it is possible to easily determine a point in time to replace and/or repair the pipe fitting and recognize leakage.

The loosening prevention device 1 according to the present invention can be applied to a variety of industrial fields, for example, water service construction, pipe construction for gas and dangerous substances, pipe construction for a nuclear plant, and the like, in which a pipe structure is extended using the pipe fitting as is well known to those skilled in the art.

FIG. 5 is a view schematically illustrating a loosening prevention device for a pipe fitting according to another embodiment of the present invention. Since the configuration of the loosening prevention device 1 is similar to that of the loosening prevention device illustrated in FIG. 1 except for the head part of the locking member and the casing, descriptions of the same or like parts will be omitted herein for a better understanding of the present invention.

The loosening prevention device 1 according to another embodiment of the present invention is designed such that the fastening between the casing 2 and the locking member 3 can be reliably maintained in order to prevent the pipe fitting from being loosened. Specifically, protrusions 25 are formed on the top surface of the female thread part 21 of the casing 2. As illustrated in FIG. 5, the protrusions 25 are formed radially along the circumference of the top surface of the female thread part 21.

In addition, protrusions 35 are formed on the bottom surface of the head 32 of the locking member 3. As illustrated in FIG. 5, the protrusions 35 are formed radially along the circumference of the bottom surface of the head 32.

When the bottom surface of the head 32 comes into close contact with the top surface of the female thread part during screw engagement, the protrusions 25 interfere with the protrusions 35. This can prevent the locking member 3 from being disengaged from the casing 2, thereby maintaining the fastened state.

Although the preferred embodiments of the present invention have been disclosed for illustrative purposes, the loosening prevention device for a pipe fitting according to the present invention is not limited thereto. Those skilled in the art will appreciate that various modifications and improvements are possible, without departing from the scope and spirit of the present invention as disclosed in the accompanying claims.

All simple alterations and changes in the present invention will belong to the range of the present invention and the specific scope of the present invention shall be defined clear by the accompanying claims.

The invention claimed is:

1. A loosening prevention device for a pipe fitting comprising:
   a casing (2) comprising a semi-barrel member (20) having an opening, a female thread part (21) disposed on one end of the semi-barrel member (20), and a closing member (22) disposed on the other end of the semi-barrel member (20); and
   a locking member (3) comprising a male thread part (31) configured to be engaged with the female thread part (21) of the casing (2) and a head (32) disposed on one end of the male thread part (31),
   wherein the female thread part of the casing has protrusions on a top surface thereof, the protrusions being arranged radially,
   wherein the head of the locking member has protrusions on a bottom surface thereof, the protrusions being arranged radially.

2. The loosening prevention device according to claim 1, wherein the female thread part (21) has a first insert opening (211) extending from an outer circumference to a central portion of the female thread part (21).

3. The loosening prevention device according to claim 2, wherein a size of the first insert opening (211) is equal to or greater than a diameter of a pipe (100) at one side that extends across the female thread part (21).

4. The loosening prevention device according to claim 2, wherein the closing member (22) has a second insert opening (221) extending from an outer circumference to a central portion of the closing member (22).

5. The loosening prevention device according to claim 4, wherein a size of the second insert opening (221) is equal to or greater than a diameter of a pipe (200) at the other side that extends across the closing member (22).

6. The loosening prevention device according to claim 4, wherein the first insert opening (211), the second insert opening (221), and the opening of the semi-barrel member (20) are arranged in a single direction.

7. The loosening prevention device according to claim 1, wherein an inner surface of the semi-barrel member (20) is shaped identical to an outer shape of the pipe fitting.

8. The loosening prevention device according to claim 1, wherein the semi-barrel member (20) further comprises a rib (24) extending on an inner circumference thereof.

9. The loosening prevention device according to claim 1, wherein the locking member (3) has a third insert opening (33) extending in a longitudinal direction thereof.

10. The loosening prevention device according to claim 9, wherein a size of the third insert opening (33) is equal to or greater than a diameter of a pipe (100) at one side that extends through the locking member (3).

* * * * *